US011524583B2

(12) United States Patent
Janzen

(10) Patent No.: US 11,524,583 B2
(45) Date of Patent: Dec. 13, 2022

(54) PLASMA-BASED HIGH-SPEED POWER TRANSMISSION SYSTEM

(71) Applicant: TRANSPOD INC., Toronto (CA)

(72) Inventor: Ryan Janzen, Kingsville (CA)

(73) Assignee: TRANSPOD INC., Toronto (CA)

( * ) Notice: Subject to any disclaimer, the term of this patent is extended or adjusted under 35 U.S.C. 154(b) by 378 days.

(21) Appl. No.: 16/331,631

(22) PCT Filed: Sep. 8, 2017

(86) PCT No.: PCT/CA2017/051061
§ 371 (c)(1),
(2) Date: Mar. 8, 2019

(87) PCT Pub. No.: WO2018/045471
PCT Pub. Date: Mar. 15, 2018

(65) Prior Publication Data
US 2019/0359062 A1   Nov. 28, 2019

Related U.S. Application Data

(60) Provisional application No. 62/385,101, filed on Sep. 8, 2016.

(51) Int. Cl.
*B60L 5/00* (2006.01)
*B60L 5/42* (2006.01)
(Continued)

(52) U.S. Cl.
CPC .............. *B60L 5/005* (2013.01); *B60L 5/42* (2013.01); *B60L 5/38* (2013.01); *B60L 53/12* (2019.02);
(Continued)

(58) Field of Classification Search
CPC .... B60L 5/00; B60L 5/005; B60L 5/04; B60L 5/18; B60L 5/22; B60L 5/24; B60L 5/38; B60L 53/12
See application file for complete search history.

(56) References Cited

U.S. PATENT DOCUMENTS 3,479,471 A    11/1969  Smith et al.
3,514,553 A *   5/1970  Penney et al. ......... H02K 13/00
                                              191/56
(Continued)

FOREIGN PATENT DOCUMENTS

DE    1806422 A1   6/1969
DE    2130199 A1   1/1973
(Continued)

OTHER PUBLICATIONS

Extended European Search Report, EP17847859.0, dated Mar. 23, 2020.

*Primary Examiner* — Robert J McGarry, Jr.
(74) *Attorney, Agent, or Firm* — Norton Rose Fulbright Canada LLP

(57) ABSTRACT

A system for electrically connecting a vehicle to track electrodes, the system comprising vehicle electrodes configured to be electrically connected with a respective one of the track electrodes; actuators operatively connecting the vehicle electrodes to a structure of the vehicle for displacement of the vehicle electrodes relative to the structure of the vehicle, the actuators operable to vary distances between the vehicle electrodes and the track electrodes; sensors operatively mounted to one of the vehicle or track electrodes, the sensors detecting variations in the distances; and a controller operatively connected to the actuators for actuating the actuators as a function of the variations in the distances detected by the sensors.

22 Claims, 4 Drawing Sheets

(51) Int. Cl.
　　　*B60L 53/12*　　(2019.01)
　　　*B60L 5/38*　　(2006.01)
(52) U.S. Cl.
　　　CPC ..... *B60L 2200/26* (2013.01); *B60L 2260/167* (2013.01)

(56) References Cited

U.S. PATENT DOCUMENTS

| | | |
|---|---|---|
| 3,818,152 A | 6/1974 | Erk et al. |
| 8,529,830 B2 | 9/2013 | Zhou et al. |
| 8,960,177 B2 | 2/2015 | Grumbine et al. |
| 9,627,780 B2 * | 4/2017 | Meinke ............... H02K 55/00 |
| 9,634,523 B2 | 4/2017 | Vollenwyder |
| 9,951,800 B2 | 4/2018 | Segawa et al. |
| 2007/0284205 A1 * | 12/2007 | Mysyrowicz ........... B60L 5/005 191/59 |
| 2009/0139781 A1 * | 6/2009 | Straubel ................. B60L 50/64 180/65.1 |
| 2012/0269677 A1 | 10/2012 | Zhou et al. |
| 2013/0229086 A1 | 9/2013 | Meinke |
| 2014/0216878 A1 * | 8/2014 | Nam ....................... B60L 5/00 191/59 |
| 2015/0267727 A1 | 9/2015 | Segawa et al. |
| 2017/0326989 A1 | 11/2017 | Segawa et al. |

FOREIGN PATENT DOCUMENTS

| | | |
|---|---|---|
| DE | 212013000247 U1 | 10/2015 |
| EP | 2884823 A1 | 6/2015 |
| GB | 1240690 A | 7/1971 |

\* cited by examiner

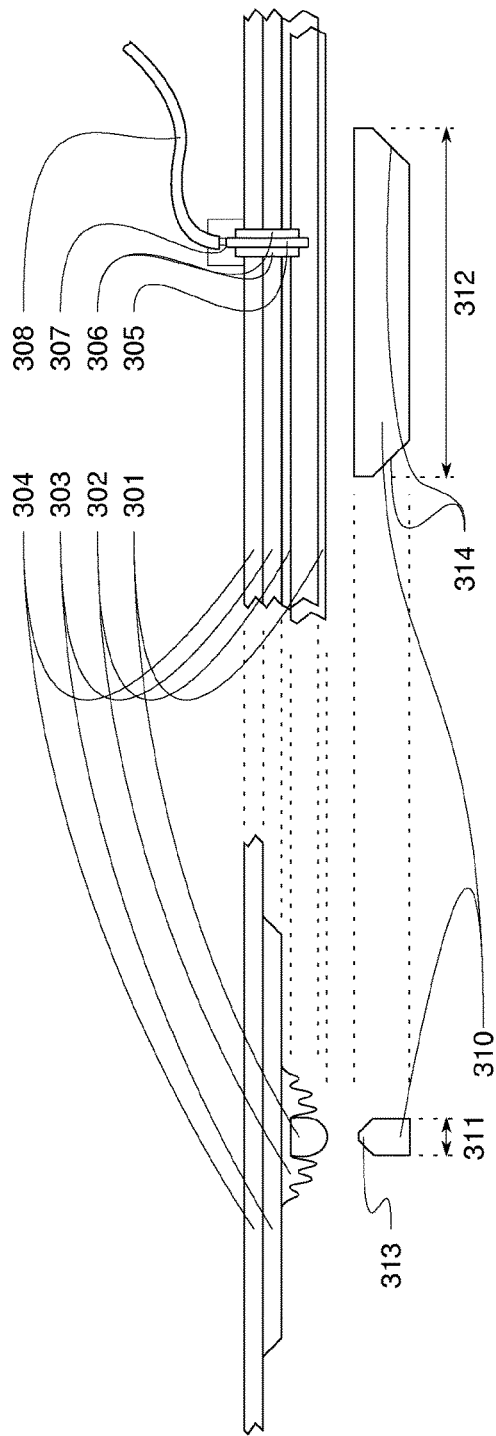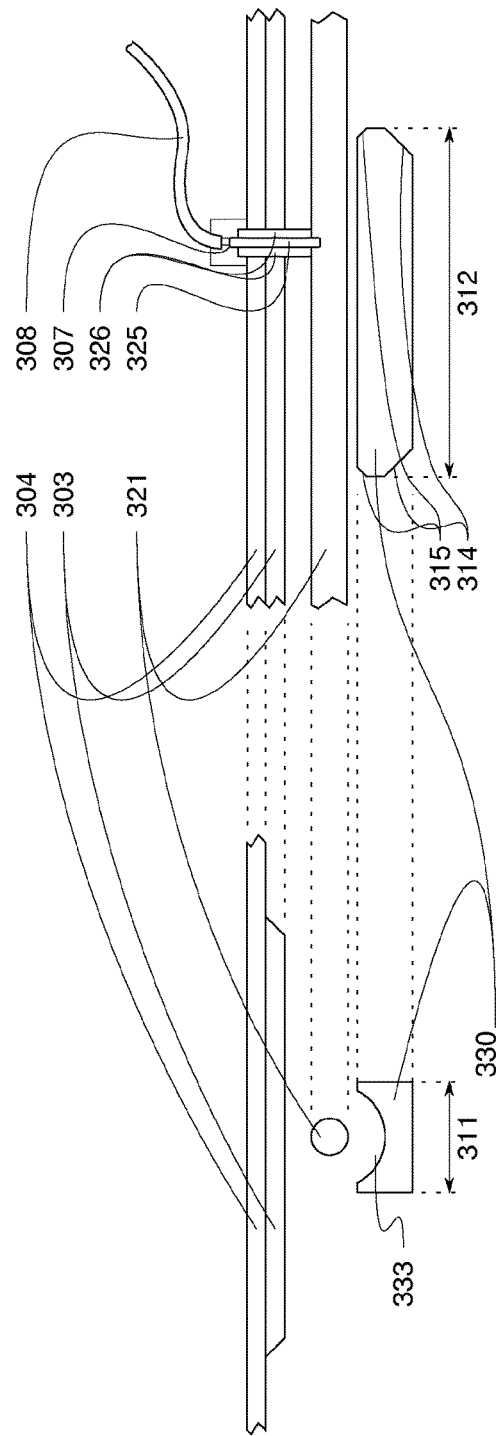
Fig. 3a
Fig. 3b

PLASMA-BASED HIGH-SPEED POWER TRANSMISSION SYSTEM

CROSS-REFERENCE TO RELATED APPLICATIONS

This application claims priority of U.S. application No. 62/385,101, the entire content of which is incorporated by reference herein.

TECHNICAL FIELD

The application relates generally to the field of transportation and, more particularly, to vehicles traversing a linear infrastructure where electric current must be passed between the vehicle and electrodes on the linear infrastructure, such as in tube transportation.

BACKGROUND OF THE ART

An electric vehicle circulating on a linear infrastructure, such as rails, typically uses a device, such as a pantograph or power pickup shoe, to receive an electrical power input from a power line. However, such a device might be ill-suited when the vehicle circulates at high speeds in part because friction between the device and the power line, may cause excessive heat, grinding, wearing, and/or other degradation, which might impair proper operation of the device.

SUMMARY

There is disclosed a system designed to transfer electrical power to or from a transportation vehicle, vessel, object, or other device, from or to infrastructure with respect to which the vehicle moves or travels. The system comprises track electrodes and vehicle electrodes, or alternately at least one track electrode and at least one vehicle electrode plus at least one additional electrical connection provided to conduct current by any suitable connections between the vehicle and infrastructure, thereby completing the circuit.

In accordance with a first embodiment, there is provided a system for electrically connecting a vehicle to track electrodes, the system comprising vehicle electrodes configured to be electrically connected with a respective one of the track electrodes; actuators operatively connecting the vehicle electrodes to a structure of the vehicle for displacement of the vehicle electrodes relative to the structure of the vehicle, the actuators operable to vary distances between the vehicle electrodes and the track electrodes; sensors operatively mounted to one of the vehicle or track electrodes, the sensors detecting variations in the distances; and a controller operatively connected to the actuators for actuating the actuators as a function of the variations in the distances detected by the sensors.

In accordance with a second embodiment, there is provided a transportation system comprising a vehicle and track electrodes disposed adjacent to the vehicle and extending along a direction of travel of the vehicle, the vehicle having an engine mounted thereto; vehicle electrodes electrically connected to the engine for receiving a high-voltage feed from the track electrodes; actuators operatively connecting a structure of the vehicle to the vehicle electrodes for displacement of the vehicle electrodes relative to the structure of the vehicle, the actuators operable to vary distances between the vehicle electrodes and the track electrodes; sensors operatively mounted to one of the vehicle or track electrodes, the sensors detecting variations in the distances, the system further comprising a controller operatively connected to the actuators for actuating the actuators as a function of the variations in the distances detected by the sensors.

Still further in accordance with the first or the second embodiments, the system is configured for electrically connecting at least one of the vehicle electrodes and at least one of the track electrodes, wherein, for instance, the system initiates and maintains a plasma state of matter between the at least one of the vehicle electrodes and the at least one of the track electrodes while the vehicle is in motion with respect to the track electrodes.

Still further in accordance with the first or the second embodiments, the system further comprises light sources mounted to the vehicle electrodes, the light sources directing light toward predetermined locations on one of the vehicle and the track electrodes. The light sources are, for instance, lasers.

Still further in accordance with the first or the second embodiments, the system further comprises at least one mirror for directing a beam of one of the light sources toward the predetermined locations.

Still further in accordance with the first or the second embodiments, one or more of the vehicle electrodes includes a cooling system, which, for instance, includes a heat exchanger having a conduit within a respective one of the vehicle electrodes for circulating a coolant, which is, for instance, oil, the heat exchanger providing a heat exchange relationship between the coolant and the respective one of the vehicle electrodes.

Still further in accordance with the first or the second embodiments, a body and/or a surface of one or more of the vehicle electrodes is/are made, for instance, of tungsten.

Still further in accordance with the first or the second embodiments, the sensors are, for instance, optical range sensors.

Still further in accordance with the first or the second embodiments, the actuators are for instance hydraulic actuators.

Still further in accordance with the first or the second embodiments, at least one of the vehicle electrodes has a dispensing mechanism for gradually replacing a dispensable material covering the vehicle electrode. For instance, the dispensing material is in a form of a strip or wire, the dispensing mechanism further comprising two spools, one of the spools delivering unused dispensable material, the other of the spools collecting used dispensable material. Still further in accordance with the first embodiment, at least one of the spools is motorized.

Still further in accordance with the first or the second embodiments, the transportation system electrically connects at least one of the vehicle electrodes and at least one of the track electrodes. For instance, the system initiates and maintains a plasma state of matter between the at least one of the vehicle electrodes and the at least one of the track electrodes while the vehicle is in motion with respect to the track electrodes.

Still further in accordance with the first or the second embodiments, the system further comprises light sources, for instance lasers, mounted to the vehicle electrodes, the light sources directing light, for instance, toward predetermined locations on one of the vehicle electrodes and the track electrodes.

Still further in accordance with the first or the second embodiments, at least one electrical contact pickup is attached, for instance, to a respective one of the vehicle electrodes to allow a contact-based mode of operation for power conduction between a respective one of the track electrodes and the respective one of the vehicle electrodes.

Still further in accordance with the first or the second embodiments, the electrical contact pickup is, for instance, selected from a group consisting of a power pickup show, a brush, or a pantograph.

Still further in accordance with the first or the second embodiments, said electrical contact pickup is moved by a respective one of the actuators, the respective one of the actuators operable to deploy the electric contact pickup during a contact mode and to retract the electric contact pickup if plasma conduction is occurring between the respective one of the track electrodes and the respective one of the vehicle electrodes to limit plasma conduction to the contact pickup.

In accordance with a third embodiment, there is provided a power control system comprising a transportation line infrastructure and sensors to determine positions of vehicles, the system controlling voltage and/or power delivered to segments of the transportation line infrastructure which are adjacent to the vehicles and reducing voltage and/or power to a remainder of the transportation line which are not adjacent to the vehicles.

Still further in accordance with the third embodiment, electric current sensors are further comprised for sensing consumption in separate segments along the transportation line infrastructure, the system configured for reducing power to segments in which leakage current is detected by at least one of a plurality of phenomena.

Still further in accordance with the third embodiment, the at least one of the plurality of phenomena is selected, for instance, form a group consisting of corona, plasma discharge current, capacitive coupling losses, conduction through degraded insulators, rainwater, contaminants, soil, biological matter, and stray objects.

Still further in accordance with the third embodiment, the system is configured for controlling electrical parameters of the transportation line infrastructure based on at least one of requests transmitted from the vehicles and/or for controlling a power absorbing load circuit of the vehicles, the power absorbing load circuit absorbing electrical power transmitted from the vehicles.

Still further in accordance with the third embodiment, the at least one of the requests is, for instance, selected from a group consisting of specific voltage request, current request, power request, frequency request, amplitude request, waveform shape request, DC offset request, and direction of power flow request.

In accordance with a fourth embodiment, there is provided a power regulation system, configured for receiving and/or transmitting power from/to a plasma-based power transmission system, and for regulating current flow for maintaining a plasma state between corresponding power transmission electrodes.

In accordance with a fifth embodiment, there is provided a power regulation system, configured for receiving and/or transmitting power from/to a plasma-based power transmission system, and for providing a regulated and/or filtered bus voltage on board a vehicle.

In accordance with a sixth embodiment, there is provided a power transmission system, configured for transferring electrical power from/to a guideway infrastructure, to/from one or more vehicle(s), wherein said power transmission system includes a controllable load configured for activating and/or regulating electrical power for absorbing an undesired excess electrical power originating from the vehicle.

In accordance with a seventh embodiment, there is provided a method for operating a system electrically connecting a vehicle to track electrodes, comprising: receiving a high voltage feed from one of a track electrode and a vehicle electrode with the other of the track electrode and the vehicle electrode through plasma; receiving data information about a distance between the vehicle electrode and the track electrode; and based on the data information, increasing or decreasing a distance between the vehicle electrode and the track electrode.

Still further in accordance with the seventh embodiment, the method further comprises directing a beam of light toward a predetermined location on one of the track electrode and the vehicle electrode for inducing plasma generation.

Still further in accordance with the seventh embodiment, the method further comprises cooling the vehicle electrode, for instance, by transferring heat of the vehicle electrode using a coolant circulating therein.

Still further in accordance with the seventh embodiment, the method further comprises gradually substituting an unused dispensable material for a used dispensable material within the vehicle electrode.

DESCRIPTION OF THE DRAWINGS

Reference is now made to the accompanying figures in which:

FIG. 3a are a side elevation view and a cross-sectional view of a track and vehicle electrodes in accordance with a particular embodiment;

FIG. 3b are a side elevation view and a cross-sectional view of a track and vehicle electrodes in accordance with another particular embodiment.

DETAILED DESCRIPTION

Figure 1:
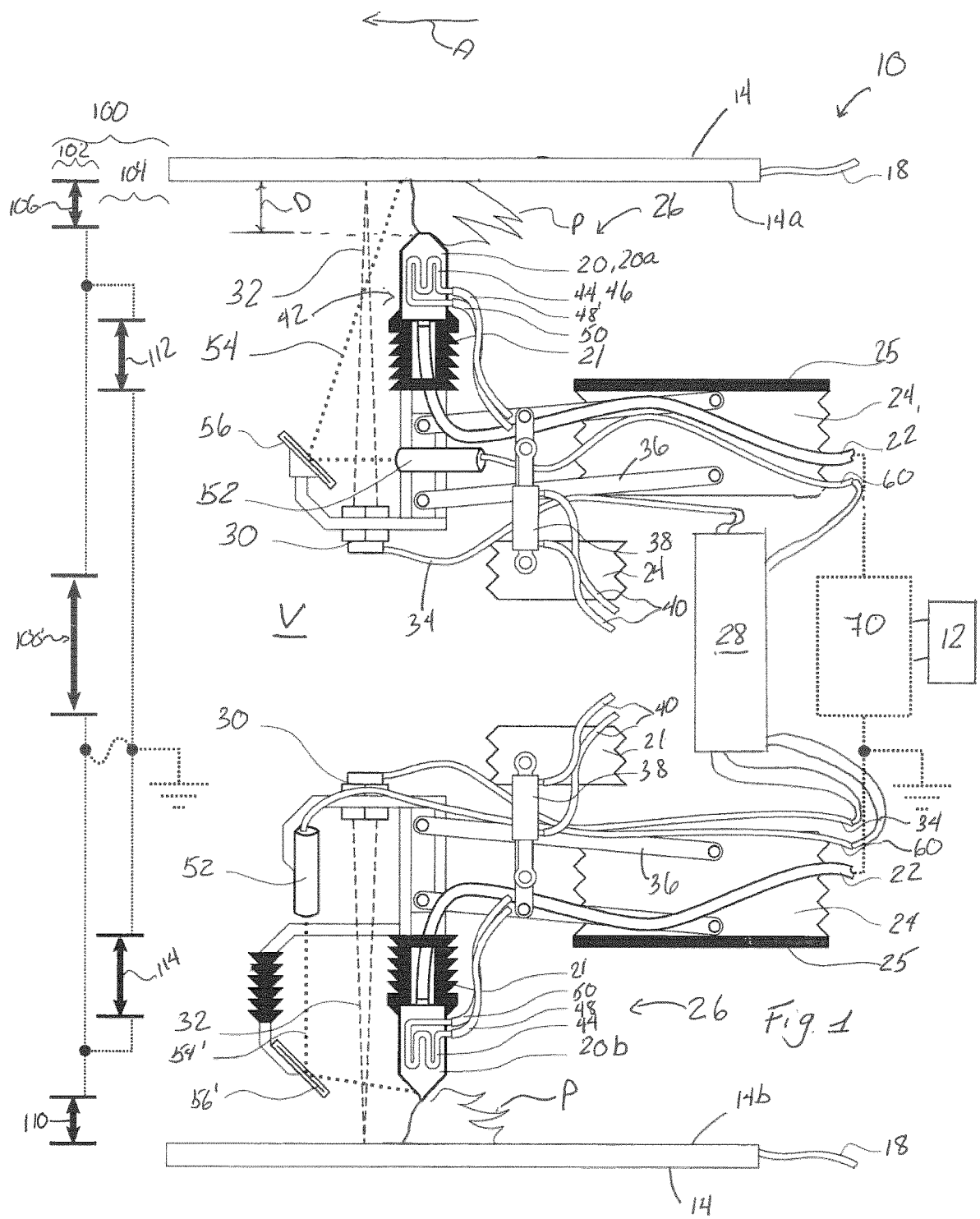
FIG. 1 is a schematic view of a system in accordance with a particular embodiment.

Referring to FIG. 1, an electrical vehicle V comprises a system 10 for powering a load 12 that requires an electrical input. In the embodiment shown, the load 12 is an engine used for propelling the vehicle V. The vehicle V circulates in proximity to power-supplying electrodes, or track electrodes 14 (two in the embodiment shown) defining a difference of potential, or a voltage drop, therebetween. The system 10 is used for electrically connecting the load 12 to the track electrodes 14. The track electrodes 14 are electrically connected to a power supply (not shown) via lines 18 suitable to carry a high voltage. In a particular embodiment, direct current (DC) is used and one of the lines 18 has a negative polarity whereas the other of the lines 18 has a positive polarity. In a particular embodiment, alternative current (AC) current is used and the lines 18 carry alternating current (AC).

The system 10 includes pickup electrodes, or vehicle electrodes 20 (two in the embodiment shown) each configured to be electrically connected to a respective one of the track electrodes 14. In the embodiment shown, the vehicle electrodes 20 are made of a material having a high melting temperature with a low electrical resistivity and with a high thermal conductivity. The material may be, for example, tungsten, but any suitable material may be used. Material choices are explained in greater detail in a later section. Each of the vehicle electrodes 20 is electrically connected to the load 12 via high voltage supply lines 22, which may be insulated. In a particular embodiment, a vehicle power conditioning unit 70 is connected between the vehicle electrodes 20 and the load 12, which may comprise more than one load. In the embodiment shown, a structure 24 of the vehicle V is grounded via one of the high voltage supply lines 22. In a particular embodiment, the vehicle structure 24 is connected into the vehicle power conditioning unit 70 which contains circuitry to regulate the voltage or electric potential of said vehicle structure with respect to one, some or all of the vehicle electrodes, with respect to one, some or all of the track electrodes, and/or with respect to a guideway structure (not shown). In the embodiment shown, the vehicle electrodes 20 have a portion covered by a high-voltage insulator 21. Similarly, the vehicle structure 24 may be protected with a high voltage insulation layer 25 for corona reduction.

The vehicle electrodes 20 are intended to conduct current either while in contact with the corresponding track electrodes 14, or while not in contact but in close proximity to the track electrodes 14. While not in contact, plasma P may develop between the electrodes 14 and 20 through which electricity is carried from the track electrodes 14 to the vehicle electrodes 20.

In the embodiment shown, the voltage supplied to the track electrodes 14 is chosen such that sufficient voltage is delivered to the vehicle electrodes 20 even after a total voltage drop associated with the plasma conduction between each corresponding pair of track and vehicle electrodes 14 and 20. In the embodiment shown, direct current is supplied to the track electrodes 14. In a particular embodiment, the vehicle electrodes 20 are designed distinctly from each other for each respective polarity.

In the system 10, the plasma P is sensitive to the relative distance D between the track and vehicle electrodes 14 and 20. Therefore, the system 10 includes mechanisms 26, one for each vehicle electrodes 20, configured to vary the relative distance D between the pairs of electrodes 14 and 20. The various mechanisms 26 of the system 10 may be independent from one another, but may be controlled concurrently. In a particular embodiment, actively maintaining a relative distance between the pairs of electrodes 14, 20 sufficiently constant improves performances of the system 10 by providing a more stable plasma hence decreasing occurrences of loss of power. In a particular embodiment, the mechanism 26 maintains the electrode 20's orientation with respect to the surface of the track electrode 14. The system 10 further includes a controller 28 to control the mechanisms 26.

Still referring to FIG. 1, although the system 10 may comprise two mechanisms 26, only one is described herein below. The system 10 may include a sensor 30 mounted on the vehicle electrode 20 for sensing the relative position and/or orientation between the vehicle electrode 20 and the corresponding track electrode 14. In the embodiment shown, the sensor 30 is an optical range/distance sensor, although other types of sensors are considered. In a particular embodiment, the sensor 30 has an active wavelength selected to minimize interference in the sensor readings caused by light emitted by the plasma P, and to minimize photoelectric emissions caused by the sensor 30. In a particular embodiment, the sensor wavelength is longer than the wavelength corresponding to the photoelectric work function of the electrode material. The sensor emits rays of light 32 that may be directed by one or more mirrors. The sensor 30 is connected to the controller 28 via suitable lines 34 or wireless connection. The controller 28 is designed to execute real-time feedback control of the mechanism 26 based on the sensor readings.

The mechanism 26 may include bracing members 36 (two in the embodiment shown) or like link and joint arrangement. In the embodiment shown, the vehicle electrode 20 is pivotally connected to the two bracing members 36 which are operatively connected to the vehicle structure 24, for instance by pivot joints. The mechanism 26 may further include an actuator 38, which is operatively connected to the vehicle structure 24 and to one or two of the bracing members 36, for instance by a pivot joint. In the embodiment shown, the actuator 38 may increase or decrease in length following a direction perpendicular to the track electrodes 14. An increase in the actuator length results in a decrease in a distance D between the track and vehicle electrodes 14 and 20. Hence, a decrease in the actuator length results in an increase in said distance D. Other configurations are contemplated. In the embodiment shown, the actuator 38 is a hydraulic actuator connected via hydraulic hoses 40 to a pump or compressor (not shown). In such a case, the controller 28 is connected via suitable lines to the pump or compressor to control movements of the actuators 38. Any suitable actuators and suitable connection lines may be used without departing from the scope of the present disclosure, such as, for example, linear actuator, multi-axis actuator, robotic arm (as illustrated), pneumatic actuators, electromagnetic, ballscrew, or multi-degree-of-freedom robotic arm.

Still referring to FIG. 1, the vehicle electrode may include a cooling system 42. The cooling system 42 uses a liquid coolant which may have a high-electrical resistance, a high specific heat capacity, and a high thermal conductivity. In a particular embodiment, the liquid coolant is paraffin oil, but any suitable coolant may be used. The cooling system 42 includes a heat exchanger 44 contained within the vehicle electrode 20. The heat exchanger 44 has a conduit or coil 46 for circulating the liquid coolant and for providing heat exchange relationship with the material surrounding the conduit 46. The heat exchanger conduit 46 is connected to a coolant inlet conduit 48 and to a coolant outlet conduit 50. The conduits 48 and 50 are fluidly connected to at least one coolant device (not shown) on-board the vehicle V used for circulating the liquid coolant and for extracting heat therefrom that has been extracted from the vehicle electrodes 20. In a particular embodiment, the coolant device includes a coolant pump and a heat exchanger or heat sink that transfers heat out of the coolant. The vehicle electrode may be built with a vehicle electrode cooling system: One embodiment, for use in atmospheric-pressure conditions, is a radiator mechanically coupled to each electrode, where heat conducts from electrode to the radiator and is dissipated in ambient air. A fan may be installed to blow air on the radiator to assist in dissipating heat, while being positioned such that the its flow does not appreciably adversely disrupt the plasma. Alternatively, this radiator can be mounted on the vehicle in a position such that air flow from the vehicle motion flows through or across the radiator to assist with heat dissipation.

Another embodiment of the vehicle electrode cooling system uses a coolant circulation system that may use a liquid coolant that may have a high-electrical-resistance liquid coolant, may have a high specific heat capacity, and may have a high thermal conductivity. Paraffin oil is one material that suits this criterion, for example, in a particular embodiment. In the case of a liquid primary coolant, the electrode has an internal heat exchanger coolant channel in which heat is transferred to this primary coolant, a primary coolant input port and a primary coolant output port, both interfaced to a vehicle cooling system on-board the vehicle which consists of a coolant pump and a heat exchanger or heat sink which transfers heat out of the coolant. Optionally a secondary coolant loop carries the heat farther, using a conventional coolant which need not have any special electrical resistance properties.

In the case where the vehicle must travel in a low-pressure environment, the heat from the vehicle cooling system can be absorbed by a heat sink on the vehicle, such as a water storage tank(s) or other heat storage material(s), phase change material(s) or reaction system(s), which is/are reset periodically when the vehicle stops, by exchanging the fluid or other material(s). For example, in the case of water-based heat storage, hot water and/or steam which was heated by the cooling system can be drained, and relatively colder water and/or ice can be loaded onto the vehicle, to provide fresh heat storage capacity. The vehicle cooling system can also be used to cool other systems on board the vehicle.

In the embodiment shown, the system 10 is designed to initiate, support, and maintain plasma between the corresponding electrodes 14 and 20 to enable high current flow at a low voltage drop across the plasma, between the corresponding conductors. In a particular embodiment, this function is performed by a vehicle power conditioning unit 70, which directs power to particular load(s) to control current flow in the plasma zones P. In one embodiment the vehicle power conditioning unit 70 includes a controllable dummy load (such as a resistor in series with a semiconductor chopper) which carries some or all of any excess current for this purpose which is beyond the current required by the vehicle load(s), and/or absorbs some or all of any excess power for this purpose which is beyond the power required by the vehicle load(s). In a particular embodiment, the plasma is in the arc regime.

In some cases, it may be required to initiate the plasma emission between the track and vehicle electrodes 14 and 20. In the embodiment shown, the system 10 further includes light sources 52 (one for each vehicle electrodes 20) attached to the vehicle V, or to the vehicle electrodes 20. The light sources 52 use a photoelectric effect to initiate electron emission from one of the electrodes 14 and/or 20 that is the target of the light sources 52. In the embodiment shown, the light sources are lasers having a specific wavelength selected to initiate the photoelectric effect at a localized position at each point in time. The light sources 52 generate optical plasma inception beams 54 that, in the embodiment shown, are directed by mirrors 56. The light sources 52 are connected to the controller 24 via suitable connection lines 60. Alternatively, the light sources 52 may operate without mirrors 56 by projecting light directly to the desired zone.

For a negative one 14a of the track electrodes 14 corresponding to a positive one 20a of the vehicle electrode 20, the beam 54 of the light source 52 is directed at the negative track electrode 14a. In the embodiment shown, the beam 54 is directed at a position either directly adjacent to the corresponding, or in this case the positive vehicle electrode 20a, or ahead of the corresponding vehicle electrode 20a, relative to a direction of travel of the vehicle V denoted by arrow A, such that electron emission is stimulated along the leading edge of the intended plasma zone.

Conversely, for the positive one 14b of the track electrodes 14 corresponding to one 20b of the vehicle electrodes 20 (in this case the negative one 20b), the beam 54' of the light source 52' is directed at the corresponding vehicle electrode 20b if it is at negative potential with respect to the track electrode. In the embodiment shown, the light source 52' is directed at a position either directly closest to the positive track electrode 14b, or ahead of the positive track electrode 14b, relative to the direction of travel A, such that electron emission is stimulated along the leading edge of the intended plasma zone. In the embodiment shown, the beam 54' is deflected with a mirror 56'.

Still referring to FIG. 1, a diagram 100 illustrates a voltage drop following the track electrodes 14 along a current-carrying circuit path 102 and a voltage drop following the vehicle structure 24 on a vehicle circuit path 104. First, on the current-carrying circuit path 102, a first drop 106 is encountered through the plasma P. Then, a second drop 108 is experienced through the load 12 and/or vehicle power conditioning unit 70. Then, a third drop 110 occurs through the plasma P on the other side, with the other traction and vehicle electrodes 14 and 20. On the vehicle circuit path 104, a first voltage drop 112 occurs through the chassis, or through the vehicle structure 24 on first side thereof and is followed by a second voltage drop 114 on a second side of the vehicle structure 24.

In a particular embodiment, the minimum wavelength of the light sources 52, 52' is selected such that it is shorter than the wavelength corresponding to the work function of the material used on the surface of the corresponding electrode 14 or 20. In that way, photons from the light sources 52, 52' may have sufficient energy to overcome the work function of a molecule or atom in said electrode, and might allow an electron to be emitted from the electrode by the photoelectric effect. In a particular embodiment, the intensity of the light source is selected such that the rate of photon emission from the light source (specifically for photons which satisfy the above wavelength criterion) meets or exceeds the corresponding rate of electron emission caused by the photoelectric effect which is required to permit a sufficient electric current to flow between the conductors, as desired.

In a particular embodiment, the system 10 includes a circuit (not shown) built into the vehicle V which delivers a transient high-voltage pulse to one or more of the vehicle electrodes 20, to initiate an arc between a corresponding pair(s) of track and vehicle electrodes 14 and 20.

In a particular embodiment, the system 10 includes a plasma zone arrestor mechanism, to absorb, diffuse, mix, neutralize, or otherwise reduce the plasma content in the ambient gas on the leeward side of the zone between the vehicle electrodes 20 and the track electrodes 14. The plasma zone arrestor may reduce undesired current conducting from the track or vehicle electrodes 14 or 20 to or from other locations, where the current does not flow between the pair of corresponding electrodes. The plasma zone arrestor may be a pipe to take in or suck in the gas, aerodynamic elements used to change the fluid-dynamic flow pattern of the gas in between the electrodes. The plasma zone arrestor may be attached to the vehicle V or to the vehicle electrodes 20, rather than to the track. Such an installation might reduce material cost.

In a particular embodiment, the system 10 includes aerodynamic elements to change the fluid-dynamic flow pattern of the gas in the intended plasma zone, between the corresponding track electrodes 14 and vehicle electrodes 20. The aerodynamic elements may include insulating plates attached to the vehicle electrodes 20, positioned ahead of the vehicle electrodes relative to the direction of travel A, to bring the stationary ambient gas up to a velocity closer to the vehicle velocity, thus reducing the relative speed of the gas with respect to the vehicle electrodes 20.

In a particular embodiment, the system 10 improves the ratio of current successfully delivered between the track electrodes 14 and the vehicle electrodes 20 and reduces the "loss" current delivered from the electrodes to undesirable current sinks, such as to the vehicle V, to the structural components of the vehicle electrodes 20, to the infrastructure components surrounding the track electrodes 14, from one track electrode directly to another track electrode, from one vehicle electrode directly to another vehicle electrode, or to the ambient space surrounding any of the electrodes (e.g. corona) if not in-route to that electrode's corresponding partner electrode on the track or vehicle.

Still referring to FIG. 1, the system 10, via its controller 28, may receive sensor readings from the sensors 30. These readings are received by the controller 28 which determines whether the distance D between the electrodes 14 and 20 should be increased, decreased, or maintained constant. Then, if the distance D is lower or greater than given thresholds, the controller 28 triggers the actuators 38 to either retract or extend to increase or decrease the distance D. The controller 28 is able to control separately each of the actuators 38. Stated otherwise, the controller 28 is able to simultaneously correct the position of either one or both of the vehicle electrodes 20 by controlling each one of the actuators 38 independently. In the embodiment shown, the controller 28 instructs the light source 52, 52' to emit a beam 54, 54' toward a desired location either on the vehicle electrodes 20 or on the track electrodes 14.

It may be required to prevent or reduce ion deposition on the electrodes, as well as oxidation and other chemical changes of the electrode materials. In a particular embodiment, this is achieved by using alternating current (AC) to power the electrodes instead of direct current (DC), or more generally, a time-varying waveform provided to the electrodes. This may prevent or reduce ion deposition, oxidation, or other chemical changes to the electrode materials.

In a particular embodiment, a dispensable conductive material, such as, for example, a metal rod, strip, wire, or bar, is used as a part of the vehicle electrodes. The dispensable conductor material is advanced to position a fresh conduction surface area of the dispensable conductor in place as needed, as the previously-used conduction surface area becomes degraded. In a particular embodiment, the dispensable conductor is positioned such that it conducts the majority of the electric current to/from the vehicle electrode 20 from/to the track electrode 14, as compared to the non-dispensable materials in the vehicle electrode 20. For example, the dispensable conductor material may be positioned closer to the track electrode 14 than the non-dispensable parts of the vehicle electrode 20, which in turn can be covered with an insulating material to reduce plasma conduction to/from the non-dispensable components on the vehicle electrode 20.

Figure 2:
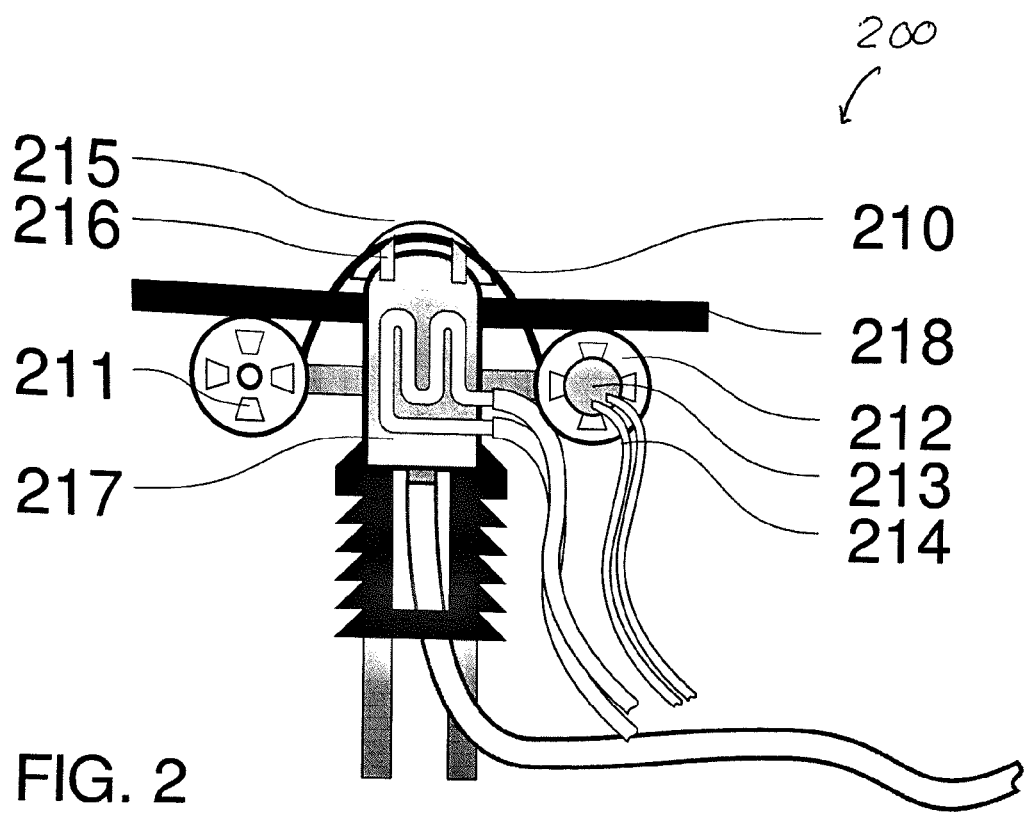
FIG. 2 is a schematic view of an electrode of the system of FIG. 1.

Referring now to FIG. 2, in a particular embodiment, the vehicle electrodes 20 illustrated in FIG. 1 comprise each a dispensing mechanism 200 that advances the dispensable material outward, to position a fresh conduction surface area of the dispensable conductor in place as needed, as the previous conduction surface area becomes degraded. As illustrated, the dispensing mechanism includes two spools 211 and 212. The first spool 211 contains fresh dispensable conductor whereas the second spool 212 collects the used degraded conductor material. In the embodiment shown, the spools 211 and 212 are driven by one or more pneumatic or hydraulic driver 213, but other suitable drivers may be used, including motors. In the embodiment shown, a non-conductive fluid such as paraffin oil is pumped through lines 214 from a pump (not shown) on the vehicle V. Hence, the material might be advanced gradually and continuously, or at discrete intervals in time. The dispensing mechanism 200 further includes one or more guides 215 in contact at one or more contact points 216 to transfer heat and electric current to the main electrode conductor 217. In the embodiment shown, the dispensing mechanism 200 further has an electrically insulated housing 218 that may be integrated and that might prevent or reduce plasma conduction to the spools 211 and 212.

In a particular embodiment, the vehicle and track electrodes are contained within a tube whose ambient pressure is pumped to a low pressure, to reduce the density of gas molecules that can be incorporated in deposition and/or oxidation of the electrodes. Alternatively, the vehicle and the track electrodes 20,14 are inside a tube which is filled or partly filled with an inert or semi-inert gas. In a particular embodiment, the pressure in the tube is reduced to a low level and the tube is filled, or partly filled, with an inert or semi-inert gas. In a particular embodiment, this saves on the amount of inert or semi-inert gas required to fill the tube volume, thus saving on costs.

Referring now to FIGS. 3a and 3b, track electrodes 301, 321 and vehicle electrodes 310, 330 are illustrated in accordance with another embodiment of the present disclosure. The track and vehicle electrodes may be rotated and/or translated to be positioned at other locations relative to a vehicle. In a particular embodiment, the plasma conduction zone is between the track electrodes 301, 321 and the vehicle electrodes 310, 330. In the embodiment shown, the track electrode 301 or 321 is mounted to structural members of the infrastructure, such as a structural surface material 304, or structural beams or suspended cables or concrete. In cases where the structural members 304 of the infrastructure are electrically conductive and grounded, an insulator is installed to electrically isolate the structure from the track electrode. In a particular embodiment, an insulator surface 303 installed between the track electrode 301 and structure 304 and extends outward a distance that is sufficient such that it might prevent or reduce flashover, breakdown, arc, corona, leakage current, or other electrical conduction between the track electrode 301 and the structure 304.

The insulator surface 303 may consist of electrically insulating polymer sheets, and/or a conformal coating insulator. In a particular embodiment, a track electrode insulator 302 is built with corrugation to increase the effective surface distance between the track electrode 301 and exposed grounded parts of the infrastructure. Multiple types of insulators may be used together. In a particular embodiment, a conformal coating insulation is applied to a wide cross-section, and is covered by a narrower insulator sheet. A further embodiment includes all three.

In a particular embodiment, the insulator(s) is/are mounted to the infrastructure in such a way that electrically conductive mounting hardware is not exposed near the track electrode and does not significantly reduce the isolation distance provided by the insulators. This might be achieved by mounting the insulators from behind, on the opposite side from the track electrode, and/or by filling or covering any mounting hardware with an insulator coating or paste. In FIG. 3a, mounting hardware is omitted for clarity.

In a particular embodiment, the infrastructure cross-section consists of one track electrode connected to an external power source, typically with an insertion conductor 305, 325, insertion insulator 306, 326, junction and junction enclosure 307, and wire or other conductor 308, along with a grounded track electrode which is typically connected to the grounded infrastructure and typically does not require insulators between itself and the structural supports. In a particular embodiment, the infrastructure cross-section includes two track electrodes, each connected to a different voltage, through insulated insertion hardware as described above.

Referring more particularly on FIG. 3b, the track electrode 321 is suspended and is typically connected with an insertion conductor 325 and insertion insulator 326, and is typically secured to the infrastructure structure either using the insertion conductor 325 and/or insulator 326 as structural support, and/or other insulated mountings between the track electrode and structural members (not shown for clarity).

Referring back to FIGS. 3a and 3b, the track electrode 301 or 321 is typically built with rounded corners or shapes. In a particular embodiment, avoiding sharp edges or sharp points reduces corona effects and/or current losses over the long distances of track electrode. In the embodiment shown, sharp edges are avoided on vehicle electrodes 310, 330 as well, such that losses and risk of high-current arcs forming from other parts of the track electrode 301 or 321 than its transmission surface might be reduced. Avoiding sharp edges might also reduce conduction from a vehicle electrode 310, 330 to objects other than the corresponding track electrode 301, 321.

The electrodes are typically shaped to affect the plasma zone's geometry. The vehicle electrodes 310 and 330 have a width 311 and a length 312. In a particular embodiment, the vehicle electrodes 310, 330 are elongated, in order to spread the arc conduction over a long length, to reduce the localized current, thermal, and/or degradation load and requirements on the electrodes 310, 330. The width 311 and transmission surface 313/333 are broadened in some embodiments. This may be best observed by comparing the transmission surface 313 of the vehicle electrode 310 that is smaller compared to the transmission surface 333 of the vehicle electrode 330. The vehicle electrode 330 might allow the spreading of the arc conduction over a broader cross-section, and might decrease the localized conduction, thermal, and/or degradation load and requirements on the electrodes.

In a particular embodiment of the vehicle electrode, fluid dynamics features are included to affect the plasma behaviour. For example, the electrode structure may be shaped with a bevel or curve 314 to redirect air that would otherwise impact the front of the vehicle electrode 330 and would be diverted toward the plasma zone. In the embodiment shown, the bevel 314 might deflect the flow away from the plasma zone. This might be used to reduce the disruption of the plasma zone. In a particular embodiments, the shape of the vehicle electrode 330 is selected to direct additional gas flow into the plasma zone.

Magnetic fields and/or electric fields may be used to alter the plasma zone shape. In a particular embodiment, a magnetic field is introduced (e.g. by an electromagnet or permanent magnet) to curve the direction of motion of charge carriers. In another particular embodiment, an electric field is introduced (e.g. by high voltage(s) applied to one or more electrodes) to attract or repel charge carriers.

In the embodiment shown, the arc or plasma zone may be prevented from repeatedly covering only a specific narrow area of the track electrode 301, 321 with each pass. In a particular embodiment, the arc or plasma zone is either spread over a broad area of the track electrode, or is manipulated to change its striking zone on the track electrode among a plurality of possible zones for each pass, such that after several passes, a given position along the track electrode's length is struck in a plurality of different portions of its cross-sectional surface curve. This may be achieved by an electromagnet positioned near the vehicle electrode, and driven by an oscillator or other waveform generator. Alternately, the vehicle electrode 310, 330 is moved in an oscillating pattern either actively by a mechanical actuator or passively due to vehicle vibration and/or mechanical resonance. Alternately, a vortex shedder bluff body can be integrated onto the vehicle electrode to produce an oscillating gas flow ahead of the plasma zone. The vortex shedder may consist of an insulating material mounted at the leading area of the electrode ahead of the plasma zone. The vortex shedder may have a shape of a prism such as a cylinder, and may be positioned with its center axis aligned with the direction of plasma conduction, to create vortex shedding oscillation obliquely to the plasma conduction direction. Alternately, the electrode shape may be designed to direct turbulence into the plasma zone. In a particular embodiment, the above recited strategies are also used to broaden or change the striking zone on a vehicle electrode.

Figure 4:
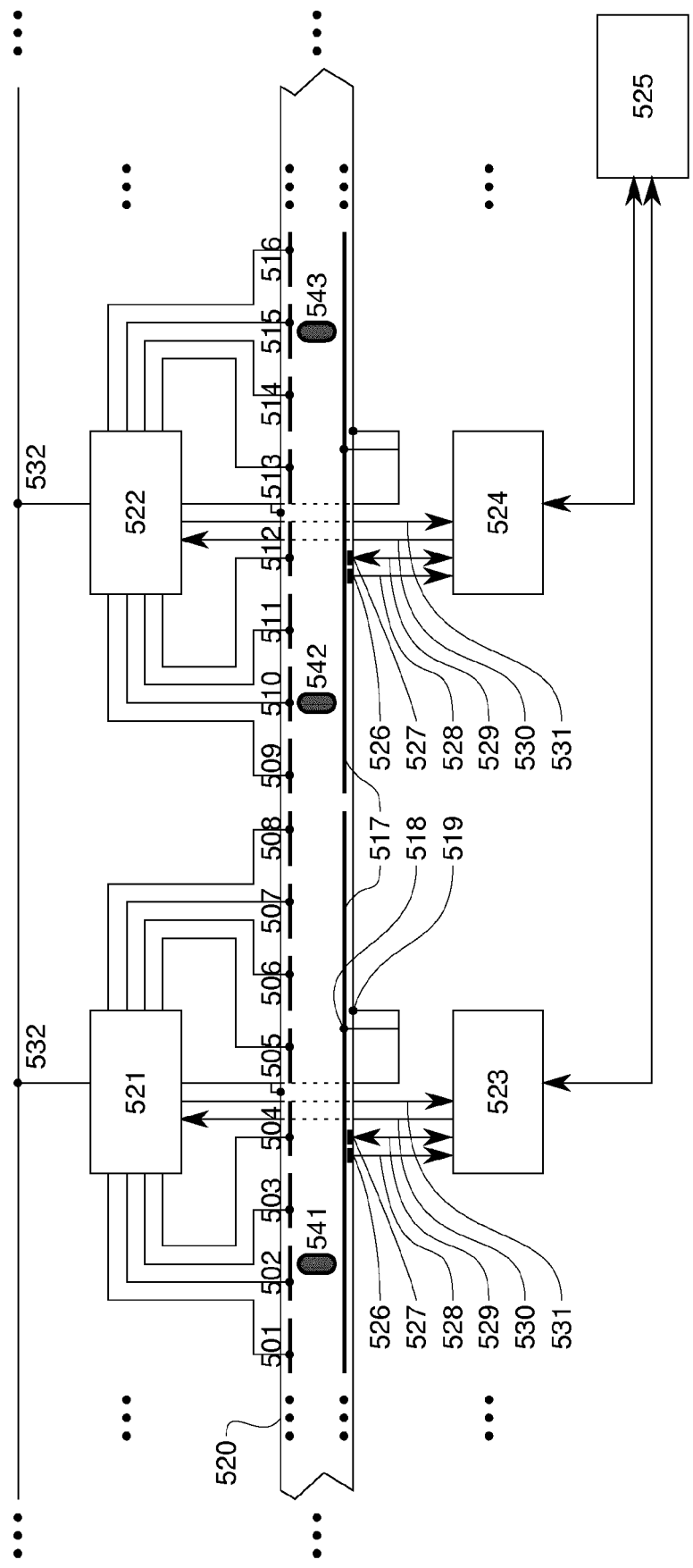
FIG. 4 is a schematic view of a segment power system in accordance with another embodiment of the present disclosure.

Referring to FIG. 4, a segment power system is shown, which controls power to a guideway divided into electrically isolated segments along the length of the guideway. The segment power system consists of one or more segment power units and one or more segment control units. Each segment power unit is able to control power to one or more segments, and has one or more output connections to each segment. FIG. 4 shows an example with one guideway 520, two segment power units 521,522, two segment control units 523,524, controlling 16 segments 501-516. This example shows a single-ended configuration with a single controlled power connection for each segment, one track electrode for each segment 501-516, grounded track electrodes 517 spanning multiple segments with a ground connection 518 in common with guideway common grounding 519. Other embodiments include differential power electrodes with two or more isolated and separately connected track electrodes for each segment, or other segment power systems as which will be described below.

Each power control device consists of one or more relays and/or semiconductor swiches (such as FETs or IGBTs) or other devices which allow control of voltage, current, amplitude, frequency, or other electrical quantities in the power outputs to the segments. In a particular embodiment, a pulse width modulation signal drives each semiconductor switch in order to control and adjust voltage and/or current in the power outputs.

Each segment power unit is provided with a power source, locally-generated and/or from a connection to a long-distance transmission line 532 for externally-generated power such as from grid connections. The lines 532 as drawn in FIG. 4 each represent two or more conductors integrated as part of the guideway infrastructure, or two or more conductors as part of external electrical grid infrastructure. A segment power unit includes a voltage reduction system if a lower voltage is required for the guideway than that of the local generation or long-distance transmission line. The voltage reduction is achieved either by using a separate commercial unit consisting of a transformer and/or solid-state power converter, and/or through control and regulation of the pulse width modulation and switching devices described earlier.

The segment power unit and/or segment control unit may be connected to a signal which indicates the positions of vehicles, and/or proximity of a vehicle to each segment. The position and/or proximity signal(s) is/are used to control the power applied to each segment. The signals may be used to increase or otherwise control the power during the time when a vehicle is present, and may also be used during an extra time margin before and/or after the vehicle passes. The proximity or position data can be provided by sensors mounted to, in or near the guideway structure 526, such as optical sensors (e.g. LASER, time-of-flight, computer vision), RADAR sensors, SONAR sensors, mechanical deflection or vibration sensors coupled to the guideway infrastructure, by position data or proximity signals transmitted from the vehicles themselves, and/or by data from a central line controller 525. As an example, if vehicles 541,542,543 are present at one point in time, then one embodiment of the control system energizes segments 502, 510,515 at that particular moment in time, while another embodiment energizes segments (e.g., 501, 502, 503, 509, 510, 511, 514, 515, 516) to provide power over an additional margin of error in proximity or position data.

In one embodiment, each vehicle transmits its electrical demands or requests for power level and/or other electrical parameters (e.g. frequency, amplitude) to the infrastructure, e.g. via a transponder or sensor 527 or other signaling system such as a radio, optical, acoustic or inductive signaling system. The segment control unit adjusts the power and/or other electrical parameters of the segment(s) adjacent to each vehicle according to each respective vehicle's demand or request. The wayside sensors 526 and transponders 527 are typically connected 528,529 directly to each local segment control unit 523, but in another embodiment are interfaced directly to a central line control system 525.

A further embodiment of the segment power unit includes a controllable load which can be activated to absorb undesired excess electrical power originating from the vehicle, through the power transmission system. The purpose of such a load is to remove excess energy from the vehicle, such as kinetic energy converted to electrical energy during deceleration through regenerative braking, in order to reduce heat management requirements of the vehicle. The controllable load can be implemented as a power resistor equipped with heat sinks and air circulation fans, and connected in series with either a relay or solid-state chopping switch, to create a controllable dummy load. This controllable dummy load is connected across the infrastructure side of the power transmission connections. The control signal can be either transmitted from each vehicle based on a heat dissipation request from the vehicle's control system, or from central line control, or by a system which detects heat dissipation needs of each vehicle such as using force sensors to detect vehicle braking.

The segment power unit may include a current sensing device for each power conductor interfaced to the guideway, to detect leakage current such as corona or other plasma discharge current, capacitive coupling losses, conduction through weak insulators, rainwater, contaminants, soil, biological matter, and/or stray objects. Each current sensing device is implemented, in one embodiment, with a series-connected resistor with a voltage measuring device across the resistor, or in another embodiment with a transformer having one of its windings series-connected through the segment power conductor circuit and another of its windings connected to a voltage measuring device. The latter method has a disadvantage of not sensing DC currents, but can be used to detect transient changes in current loss, or current loss when alternating current or other time-varying signals are applied to the segment power lines. Signals from each current sensing device are fed 531 into a control/decision system which is designed with a lookup table or other input-output function, providing a signal 530 to control (e.g. reduce) the corresponding segment voltage (or other parameter) in the case of current leakage.

The segment power system, in alternate embodiments consisting of one or more of the above features, is applied to additional types of electrified guideway systems, beyond systems which require plasma conduction. These power system embodiments are designed for guideways with electrical or electromagnetic systems installed such as MagLev, linear induction motors, linear synchronous motors, inductive power transmission to vehicles, catenary and/or contact rail-based power transmission to vehicles, electromagnetic braking, propulsion, or levitation systems. The segment power system provides segment control to be able to shut down specific zones, in case of short circuits, insulator degradation, mechanical damage, corona prevention, and/or to protect humans during maintenance, repair operations, and/or evacuations of vehicles along the guideway, and/or to control guideway power according to vehicle power requests.

In one embodiment, the segment power system is designed for tube guideways which contain a reduced gas pressure environment inside, in which plasma-based losses are particularly prevalent due to the low gas pressure. Here, the segment power system reduces voltage or power to segments as described above. In a particular embodiment, the system reduces voltage or power during the absence of vehicles, for segments suffering from current leakage or reduced breakdown voltage, and during human incursions as described above.

In a particular embodiment, power collected on each vehicle is connected into the input of a power converter system on the vehicle, which might filter and/or regulate its output bus voltage, to reduce variations caused by reduced-voltage segments, gaps between segments, noise caused by the power transmission and/or the segment power units and/or the power source feeding the segment power units. This can be accomplished by feedback control of a solid-state chopper such as a Buck converter, and/or filtering based on inductors and/or capacitors.

In a particular embodiment, guideway segments in human-occupied areas including stations, maintenance areas, and/or storage areas, are supplied with a reduced voltage in case of human contact.

Returning specifically to embodiments with track electrodes: in a particular embodiment, the track electrodes are installed with gaps between adjacent segments, to avoid conduction (a) directly from one segment to the next, and/or (b) from one segment to a vehicle electrode, and subsequently from that vehicle electrode to the another track segment. In a particular embodiment, each vehicle is designed with sufficient backup or reserve power to cope with power loss while passing (a) gaps between segments; (b) shut down segments; (c) reduced voltage segments.

In the case of differential power transmission (two different nonzero voltages transmitted from two track electrodes in the cross-section, respectively), each pair of track electrodes is typically controlled symmetrically, (e.g. switch both on or off at the same time, and/or equal but opposite voltages), for safety protection to ensure zero voltage during maintenance or evacuation. An exception is when more leakage or breakdown problems are detected for one electrode than the other. For differential power transmission, each segment 501-516 has two connections from the power control units 521,522, and two track electrodes are isolated in each segment. A ground electrode is optional. If conduction to the guideways ground is not provided (e.g. in the case of certain levitated vehicles), a vehicle chassis voltage regulation system may be included on the vehicle. In the case of single-ended power transmission (one track electrode in the cross-section is energized with respect to a ground or neutral electrode), the single non-ground electrode in each segment typically switched as in FIG. 4. For either differential or single-ended power transmission, any grounded or neutral track or electrode and/or the grounded or neutral parts of the track infrastructure are typically kept connected and/or grounded constantly for safety reasons.

In a particular embodiment, material is chosen for an electrode outer surface such that when it is degraded (by electroplating, oxidation, or other chemical process) its degraded material is not significantly reduced in electrical conductivity. For example, copper is employed as an electrode material in one embodiment, since copper oxide is only marginally reduced in conductivity compared to copper. Conversely, aluminum is a poor choice for this due to the poor conductivity of aluminum oxide.

Additional embodiments of an electrode include the following materials, in the electrode bulk 3D body, or otherwise merely coated on the surface:

Coating or bulk material with a low work function (e.g. thorium) to aid in the emission of charge carriers.

Coating or bulk material to reduce surface pitting due to the arc, due to localized temperature increases. Typically high melting temperature. e.g. tungsten.

Coating or bulk material on a vehicle electrode to reduce damage or degradation on its corresponding traction electrode.

Coating or bulk material on a traction electrode to reduce damage or degradation on its corresponding vehicle electrode.

Techniques to deposit as coatings can include: electroplating, chemical bonding, or mechanical deposition or mounting. In a particular embodiment, after construction and between uses of the system, the electrodes are regularly polished or ground as necessary if any oxidation or chemical degradation appears, or if pitting or other geometric deformations have been created. Oxidation or other degradations can be assessed according to the effect on electrical resistance: A material whose resistance is sufficiently high to increase in temperature or reactivity during electrical conduction, such that further degradation occurs which further increases resistance, should be removed or cleaned off. Pitting or other geometric deformations should be polished, in so far as they significantly concentrate portions of the arc current or heating to create a runaway degradation, or risk of mechanical impact between electrodes.

In one embodiment, a shoe or brush is attached to a vehicle pickup, to allow a contact-based mode operation for power conduction. The shoe can consist of a standard power pickup shoe as used in the rail industry, of the type ordinarily used for contact between a train and a power transfer rail. The shoe is mounted such that, when deployed, it is at a closer distance to the the track electrode than the vehicle electrode to avoid scraping damage between the track and vehicle electrodes. An actuator may be installed to retract and deploy the shoe: deployed during contact mode, and retracted during arc mode. This actuator may be attached to link the vehicle electrode structure to the vehicle contact shoe, to allow the shoe to take advantage of the previously described position control system, and/or power transfer wiring. With respect to the latter, optionally the power transfer wiring need not be shared, and the shoe can be connected by a different wire than the electrode's main power wire, in order to directly connect the shoe to different power electronics than the electrode to account for a different expected track voltage during shoe operation. This requires circuit protection such as a series-connected isolation relay, which can be open-circuited whenever the shoe is retracted in order to prevent plasma-carried high voltage to enter the shoe and damage the shoe circuitry during arc conduction operation.

The contact mode of operation can be used in the situations of (a) increased ambient pressure; (b) low voltage availability in the track electrodes; when in either case, the required electrical breakdown voltage for an arc to occur would be greater than the operating voltage, for a given ambient pressure and desired gap separation between vehicle electrode and track electrode.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for electrically connecting a vehicle to at least one track electrode, the system comprising at least one vehicle electrode each configured to be electrically connected with a respective one of the at least one track electrode via a plasma while the vehicle is in motion with respect to the at least one track electrode; and a cooling system for transferring heat accumulating in one or both of the at least one track electrode and the at least one vehicle electrode to at least one thermal sink being at a lower temperature than the one or both of the at least one vehicle electrode and the at least one track electrode.

2. The system of claim 1, further comprising at least one light source mounted to the vehicle, the at least one light source directing light toward predetermined locations on one of the at least one vehicle electrode and the at least one track electrode.

3. The system of claim 2, wherein the at least one light source is chosen such that its emissions contain wavelengths whose photon energy meets or exceeds a work function of an electrode surface material.

4. The system of claim 1, wherein the cooling system includes a liquid coolant loop circulating a liquid coolant between the at least one thermal sink and the one or both of the at least one vehicle electrode and the at least one track electrode, the liquid coolant including a low electrical conductivity material.

5. The system of claim 4, wherein the liquid coolant loop extends within the at least one vehicle electrode.

6. The system of claim 1, wherein a body and/or a surface of one or more of the vehicle electrodes is/are made of a material having a low work function.

7. The system of claim 1, wherein at least one of the vehicle electrodes has a dispensing mechanism for gradually replacing a dispensable material covering the vehicle electrode.

8. The system of claim 1, wherein at least one electrical contact pickup is attached to a respective one of the at least one vehicle electrode to allow a contact-based mode of operation for power conduction between a respective one of the at least one track electrode and the respective one of the at least one vehicle electrode.

9. The system of claim 8, wherein said electrical contact pickup is moved by at least one actuator, the at least one actuator operable to deploy the electric contact pickup during a contact mode and to retract the electric contact pickup if plasma conduction is occurring between the respective one of the at least one track electrode and the respective one of the at least one vehicle electrode to limit plasma conduction to the contact pickup.

10. The system of claim 1, comprising at least one actuator operatively connecting the at least one vehicle electrode to a structure of the vehicle for displacement of the at least one vehicle electrode relative to the structure of the vehicle, the at least one actuator operable to vary a distance between the at least one vehicle electrode and the at least one track electrode.

11. The system of claim 10, comprising at least one sensor detecting variations in the distance and a controller operatively connected to the at least one actuator for actuating the at least one actuator as a function of variations in the distance detected by the at least one sensors.

12. A transportation system comprising a vehicle and at least one track electrode disposed adjacent to the vehicle and extending along a direction of travel of the vehicle, the vehicle having an engine mounted thereto; at least one vehicle electrode electrically connected to the engine for receiving a high-voltage feed from the at least one track electrode; at least one actuator operatively connecting a structure of the vehicle to the at least one vehicle electrode for displacement of the at least one vehicle electrode relative to the structure of the vehicle, the at least one actuator operable to vary a distance between the at least one vehicle electrode and the at least one track electrode; a sensor operatively mounted to one of the vehicle or track electrodes, the sensor detecting variations in the distance, the system further comprising a controller operatively connected to the at least one actuator for actuating the at least one actuator as a function of the variations in the distance detected by the sensor.

13. The transportation system of claim 12, wherein the at least one vehicle electrode and the at least one track electrode are electrically connected to one another via a plasma state of matter therebetween while the vehicle is in motion with respect to the at least one track electrode.

14. The transportation system of claim 12, further comprising at least one light source mounted to the vehicle, the at least one light source directing light toward predetermined locations on one of the at least one vehicle electrode and the at least one track electrode.

15. The system of claim 14, wherein the at least one light source is chosen such that its emissions contain wavelengths whose photon energy meets or exceeds a work function of an electrode surface material.

16. The system of claim 12, comprising a cooling system for transferring heat accumulating in one or both of the at least one track electrode and the at least one vehicle electrode, the cooling system comprising a liquid coolant loop circulating a liquid coolant between at least one thermal sink and the one or both of the at least one vehicle electrode and the at least one track electrode, the at least one thermal sink being at a lower temperature than the one or both of the at least one vehicle electrode and the at least one track electrode, the liquid coolant including a low electrical conductivity material.

17. The system of claim 12, wherein the at least one sensor is an optical range sensor.

18. The system of claim 12, wherein at least vehicle electrode has a dispensing mechanism for gradually replacing a dispensable material covering the vehicle electrode.

19. A method for operating a system electrically connecting a vehicle to a track electrode, comprising:
  a. receiving a high voltage feed from one of the track electrode and a vehicle electrode with the other of the track electrode and the vehicle electrode through plasma;
  b. receiving data information about a distance between the vehicle electrode and the track electrode; and
  c. based on the data information, increasing or decreasing a distance between the vehicle electrode and the track electrode.

20. The method of claim 19, further comprising directing a beam of light toward a predetermined location on one of the track electrode and the vehicle electrode for inducing plasma generation.

21. The method of claim 19, further comprising cooling the vehicle electrode.

22. The method of claim 19, further comprising gradually substituting an unused dispensable material for a used dispensable material within the vehicle electrode.

* * * * *